United States Patent [19]

Connell

[11] Patent Number: 5,234,053
[45] Date of Patent: Aug. 10, 1993

[54] REELED TUBING COUNTER ASSEMBLY AND MEASURING METHOD

[75] Inventor: Michael L. Connell, Houston, Tex.

[73] Assignee: Halliburton Geophysical Services, Inc., Houston, Tex.

[21] Appl. No.: 914,077

[22] Filed: Jul. 16, 1992

[51] Int. Cl.$^5$ .................. E21B 19/22; E21B 41/00
[52] U.S. Cl. ........................ 166/250; 166/64; 166/77; 166/384
[58] Field of Search ............ 166/250, 64, 77, 384; 33/701, 835; 73/151

[56] References Cited

U.S. PATENT DOCUMENTS

| | | | |
|---|---|---|---|
| 3,116,793 | 1/1964 | McStravick | 166/77 X |
| 3,313,346 | 4/1967 | Cross | 166/77 X |
| 4,585,061 | 4/1986 | Lyons, Jr. et al. | 166/77 |
| 4,673,035 | 6/1987 | Gipson | 166/77 |

Primary Examiner—Stephen J. Novosad
Attorney, Agent, or Firm—William J. Beard

[57] ABSTRACT

The present apparatus describes a mechanism used with a lubricator used for straightening tubing inserted into a well during service operations. The injector incorporates multiple drive chains which carry gripping blocks or mechanisms for engaging the tubing and which provide direct measurement of the travel of the tubing as it is inserted. As tubing is inserted, a sprocket is rotated on engagement with the drive chain and it in turn rotates a shaft supporting a smaller sprocket engaged by a link chain with another sprocket. The various sprockets have selected teeth ratios to provide the requisite proportionate scaling of the system. The last sprocket drives a pulse generator which forms pulses proportionate to tubing insertion into the well.

10 Claims, 2 Drawing Sheets

REELED TUBING COUNTER ASSEMBLY AND MEASURING METHOD

BACKGROUND OF THE DISCLOSURE

The present disclosure is directed to an apparatus and related method which enables measurements to be made of lengths of tubing, particularly the kind of tubing that is used in servicing an oil and gas well. It is particularly intended to be used with coil tubing which is inserted into the well at the well head from a coil of tubing supplied on a large drum or reel.

After a well has been completed, it is necessary to periodically service the well. There are many occasions where the service procedure is carried out by utilization of coil tubing. This is tubing which is relatively small in diameter, perhaps between 1 and 2 inches in diameter and which is inserted into the well head through a lubricator assembly (stuffing box) at the well head. Typically, there is a pressure differential in the well so that the well is a closed chamber producing oil or gas or a mixture from the pressurized well. The tubing that is inserted into the well is normally inserted through a lubricator mechanism which seals the well for pressure retention in the well. The tubing is inserted into the well through the lubricator mechanism by an upstanding device. The upstanding device is an injector which incorporates a set of blocks which straighten out the tubing. The tubing is flexible and can bend around a radius of curvature which enables the coiled tubing to be inserted into the well borehole through a stuffing box or lubricator. The injector mechanism is thus needed so that several thousand feet of coil tubing can be supplied on a single drum or reel and spooled off.

It has been attempted in the past to measure the length of tubing inserted into the well by positioning a measuring wheel in contact with the tubing at some point between the reel which stores the coil tubing and the injector. In this region the tubing is not straight, and it is not loaded i.e., it is not supporting weight. In other words, it is in a curved and relaxed state, and this creates difficulties for the mechanism which is required to straighten the tubing. After the tubing has been straightened by the injector, it is somewhat lengthened as it is axially loaded. Measurements of the length of tubing from any point before the tubing has been straightened and loaded provide erroneous measurements. It is important to accurately make these measurements so that the length of tubing inserted into the well can be known.

The tubing is often provided for supporting a wireline on the interior. Wireline measuring devices are well known but they cannot work where the wireline is on the inside of the tubing because the wireline measuring devices require a measuring wheel to contact the wireline under tension. It is not possible merely to adapt the wireline measuring device to the tubing because, in effect, it would measure the tubing subject to the errors mentioned namely, that the tubing is curved or coiled and also relaxed, and has not had the opportunity to be straightened.

There are additional limitations on the application of a measuring wheel to the coiled tubing. As always, the wear at the measuring wheel creates a source of error. In addition to that, there is the requirement that the wheel frictionally engage the tubing. If the loading forces that urge the measuring wheel against the tubing are insufficient, there may be slippage at that contact. Even where the loading forces are sufficient that there is good frictional engagement, there also may be another problem, namely, that the tubing will contact petroleum from the well or otherwise become externally coated to reduce friction. In any instance, the frictional loading that is applied to the measuring wheel cannot necessarily over come slippage from grease or petroleum products on the external surface of the tubing. In summary, it is just very difficult to make measurements of tubing length actually inserted into the well.

By contrast, the present system attempts to and successfully measures the length of tubing inserted into the well borehole by making connection with the chain which is involved in the injector. There is a drive chain which is aligned by a number of rollers which carries tubing engaging devices so that the tubing is grasped and straightened and is axially aligned with the stuffing box and the well head equipment. This drive chain supports a set of devices which grasp the tubing and which are known as gripping blocks. This chain is deployed with the gripping blocks in contact with the tubing so that there is no slippage. While wear of the components in this system may well occur, it does not necessarily produce slippage between chain motion and tubing motion. In other words, the travel of the chain remains precisely equal to the travel of the tubing, and especially after it has been straightened and axially loaded. The system incorporates a sprocket which is connected with the drive chain of the injector. The sprocket is rotated in proportion to the linear travel of the tubing through the injector. Moreover it utilizes a sprocket which is positively engaged with the chain so that the aggregate motion of the chain which is involved in several thousand feet of tubing provides a proportionate rotation to the sprocket. The sprocket engaging the drive chain is provided with a support shaft for its mounting, and the shaft supports an additional sprocket. A take off chain is used which is much smaller because it is not required to provide the substantial power transfer necessary for the drive chain. The take off mechanism then permits connection with additional sprockets having the required ratios thereby providing an output which is sized to movement of the chain and which carries with it a constant of proportionality so that a output pulse encoder can be driven, thereby providing necessary signals to a counter. The counter provides an output measurement which, in conjunction with appropriate pulse encoding, is enabled for direct measurement of the tubing inserted into the well. This apparatus mounts readily at the injector and is supported on the injector so that it can be permanently left there and can be dismounted with the injector for reinstallation from job to job. This accomplishes a measurement system which can be simple in operation, and which is able to operate without any impediments to its successful use.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
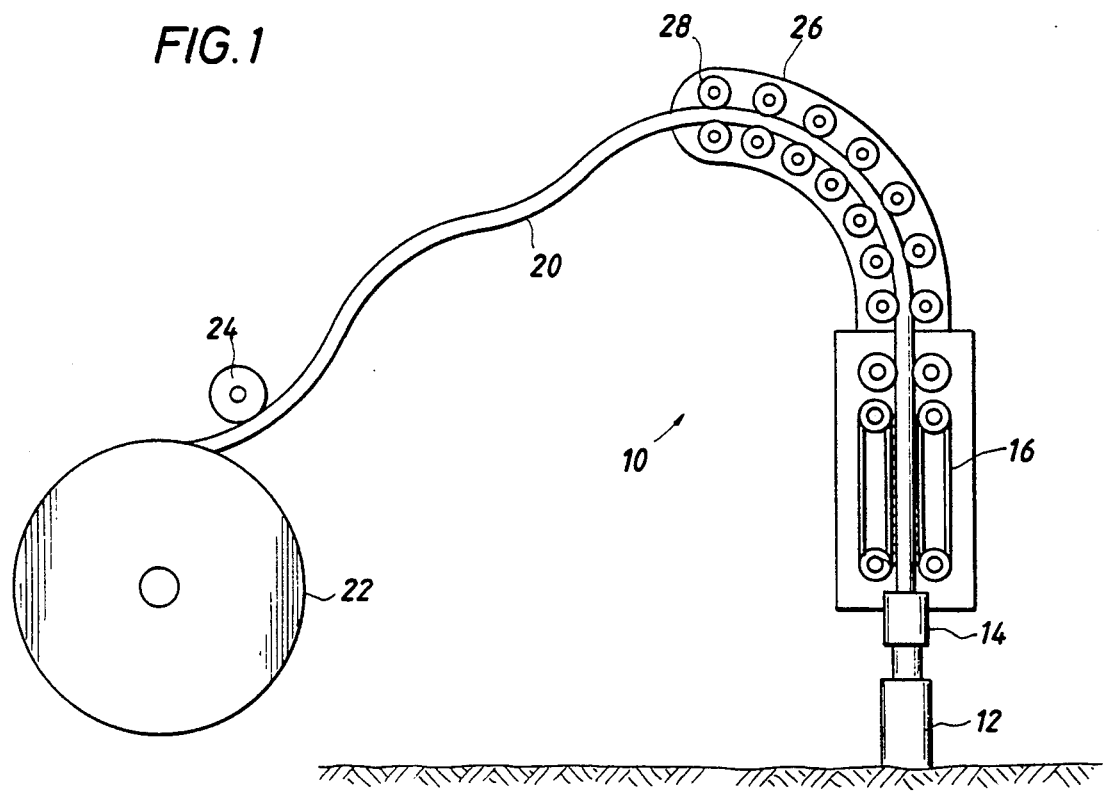
FIG. 1 shows a coil tubing system where a reel of tubing provides tubing for an injector which is straightened by a set of rollers and is inserted into a well head through a lubricator or stuffing box for down hole operations utilizing the tubing.

Attention is now directed to FIG. 1 of the drawings where the numeral 10 identifies a tubing injection system in accordance with the present disclosure. The tubing injection system will be described first to provide an understanding of the context of the present invention. This description will set the stage for the measurement system which is described in greater detail on reference to FIGS. 2-4, and the mode of operation will then be given utilizing the schematic block diagram of FIG. 5. In FIG. 1, a well head 12 is provided with a stuffing box or lubricator 14. The well is typically pressure isolated. That is entry into the well must be through the stuffing box which enables the tubing at atmospheric pressure to be placed in the well which may operate at higher pressures. Entry into the well requires that the tubing be straight. To this end, the apparatus 10 incorporates an injector which is constructed with drive chains 16 which carry blocks which grip the tubing 20. The gripping blocks and other details of the lubricator and injector had been omitted because it is believed that they are well known, while sufficient aspects of that structure are illustrated so that the engagement of the tubing 20 with the injector will be understood.

The tubing 20 is supplied on a large drum or reel 22, and typically is several thousand feet in length. Tubing of sufficient length can be inserted into the well, even lengths as long as 10,000 feet or greater. Typically, the tubing is in a relaxed but coiled state when supplied from the drum or reel 22. It is spooled from the reel typically supported on a truck for mobile operations. As it comes off the drum, it has to pass over the wheel 24 which is a measuring device. The injector has an upstanding frame work 26 which supports a number of rollers 28. These rollers define a pathway for the tubing 20 so that the curvature in the tubing can be slowly straightened. As will be understood, the tubing is formed of material which is sufficiently ductile that it can be curved for storage on the drum or reel 22 and also later straightened. While the metal is ductile, and will accept bending around a radius of curvature, it runs the risk of being pinched should the curvature be severe. The rollers 28 are spaced at a spacing that straightening of the tubing is accomplished whereby the tubing is inserted into the well without kinks or undue bending on the tubing. The integrity of the tubing is preserved by this mechanism. The injector thus supports the rollers 28 which are positioned collectively so that straightening is accomplished without undue bending.

As the tubing 20 is inserted downwardly through the injector, it is engaged positively by a set of gripping blocks (omitted for sake of clarity of the drawings) and the tubing is forced downwardly. The tubing thus travels downwardly at the same velocity precisely on movement with the drive chain 16. It will be understood that the tubing is pinched or caught between duplicate sets of equipment illustrated on both sides of the tubing in FIG. 1. The gripping blocks provide positive engagement. Accordingly, the drive chain travels in proportion to the travel of the tubing. That is to say, if 1,000 feet of tubing is inserted into the well borehole through the stuffing box 14, then the drive chains 16 both rotate to provide this travel, namely 1,000 feet. To that degree, movement of the tubing is made proportional to movement of the two drive chains which are illustrated in FIG. 1. Since they provide duplicate sets of equipment, both can be connected with the measuring apparatus of the present disclosure. Indeed, if there is the least apprehension of slippage, then both of the drive chains can be provided with the measuring equipment of the present disclosure so that two sets of equipment can be provided. This especially is helpful in the event of the unanticipated failure of either system.

Figure 2:
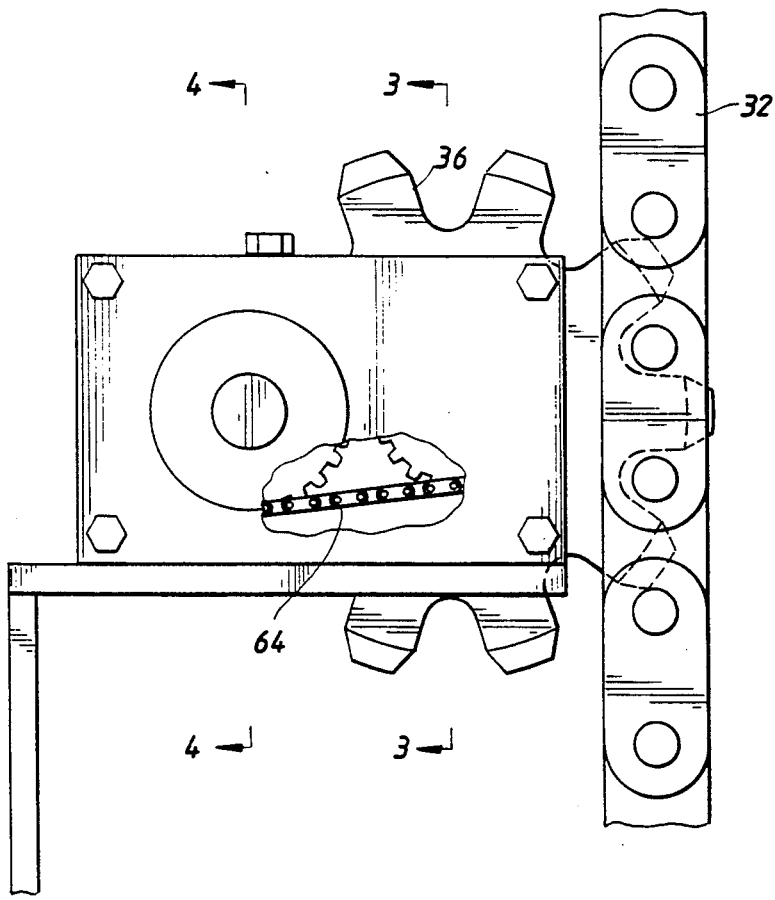
FIG. 2 shows an enlarged view having the drive chain of the injector shown in detail traversing the injector wherein the present apparatus positions a sprocket engaged with the drive chain to rotate with the drive chain, and further showing a mounting mechanism for the sprocket and a smaller chain which connects between a pair of sprockets to provide a desired ratio.

Attention is now directed to FIG. 2 of the drawings. There, the drive chain 16 is shown in greater detail and is constructed with a number of identical links 32. These are large or heavy duty links. They have a pitch which is determined by the weight of the chain. It is not uncommon to use chains which have a very long pitch. For instance, an example will be developed below where the links have a pitch of 1.75 inches which is the requisite pitch in 140 size chain. This chain, being relatively heavy, requires this type of link for transfer of the power that is required to positively insert the tubing after straightening into the well. It should be kept in mind that, from the region of the drive chains, the tubing is both straight and under controlled tension dependent on the amount of weight of service equipment affixed to the lower end of the tubing and the weight of the tubing itself.

Figure 3:
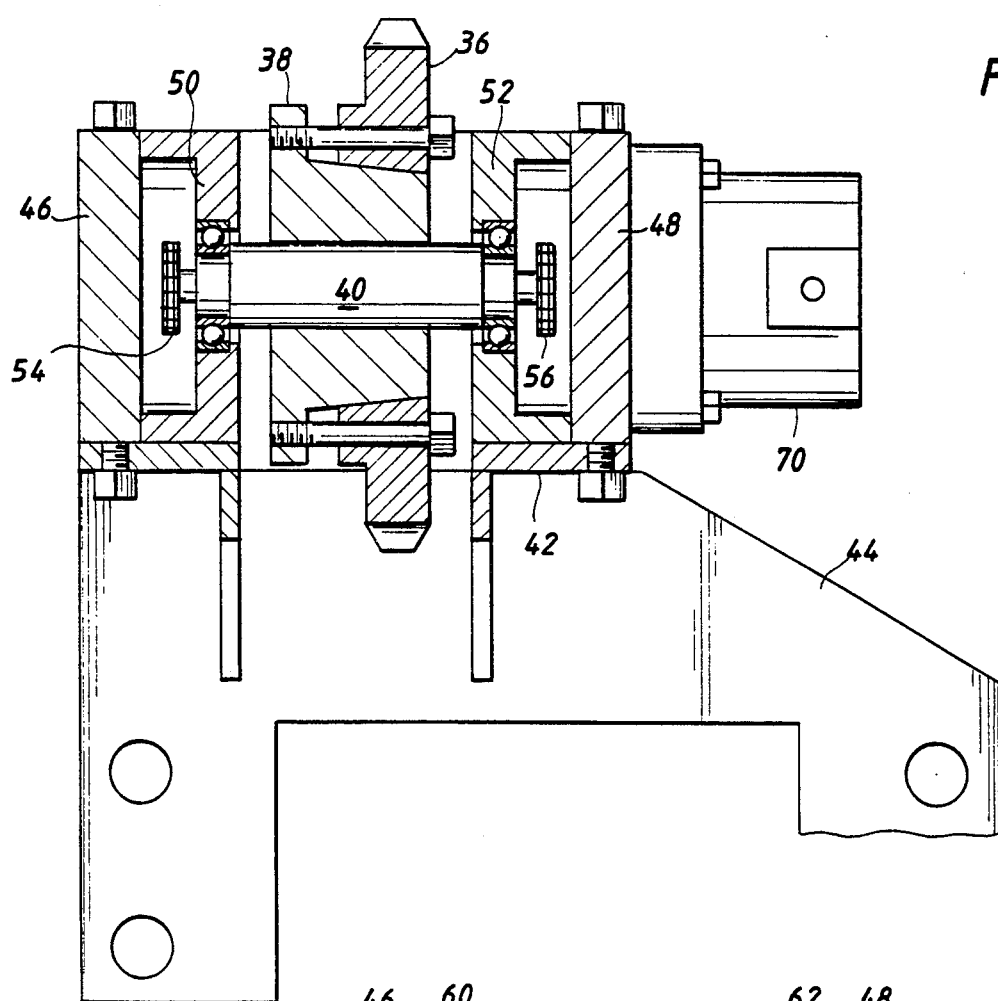
FIG. 3 is a sectional view through the sprocket shown in FIG. 2 further showing mounting for the shaft of the sprocket and additional sprockets at the end of the shaft.

Continuing further with FIG. 2, the numeral 36 identifies a toothed sprocket which is rotated in a precise relationship with movement of the chain 32. As shown in FIG. 3 of the drawings, the sprocket 36 is mounted for rotation on a shaft 40 which supports the sprocket. The shaft has a supportive hub 38 affixed to the exterior and the sprocket is bolted to the hub. The shaft provides a suitable axis of rotation for the sprocket that assures that the sprocket is positioned for engaging the links in the chain. FIG. 3 shows a housing 42 which supports the present apparatus. The housing 42 is integral attached to a mounting bracket 44 which enables fastening to the injector 10 in proximity of the link chain. The housing 42 incorporates internal transverse parallel walls 46 and 48. These are spaced from each other. The two walls support internally parallel walls 50 and 52 which in turn are provided with aligned passages to support journaled bearing assemblies for the shaft 40 to enable rotation with minimal friction. Moreover, the shaft 40 is locked in position to prevent lateral movement, and supports end located shafts which in turn support smaller sprockets 54 and 56 rotated by the large drive sprocket 36 engaging the drive chain.

Figure 4:
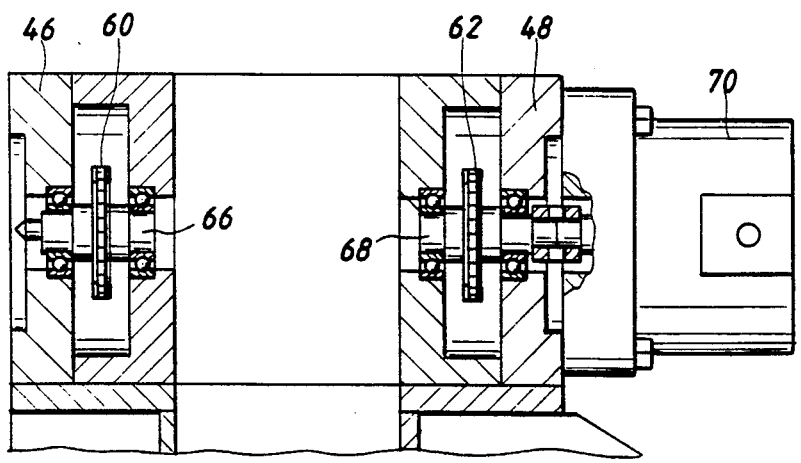
FIG. 4 is a view taken along the line 4—4 of FIG. 2 showing a second set of sprockets which are connected with the sprockets shown in FIG. 3 by a smaller link chain which enables connection with a pulse generator.

Attention is now directed to FIG. 4 of the drawings. There, it will be observed that the structural walls 46 and 48 have sufficient extent to support a pair of driven sprockets. The sprocket 54 shown in FIG. 3 is aligned with the sprocket 60 while the sprocket 56 is aligned with the sprocket 62. The sprocket 54 drives the sprocket 60 by means of a link chain 64 shown in FIG. 2 of the drawings where a portion of the supportive structure is broken away to illustrate the link chain. The link chain 64 is duplicated for the sprockets 56 and 62. Recall that the link chain 32 is denoted as the drive chain. It is relatively large because substantial loads are placed on it. The sprocket chain utilized in FIG. 2 is much smaller because it is not required to transfer substantial loads. Indeed, a very small chain can be used as will be developed below. The mechanism shown in FIG. 4 thus positions the sprockets 60 and 62 in a coaxial arrangement supported by appropriate bearings as previously mentioned for the other sprockets, and they rotate on suitable sprockets supported on the shafts 66 and 68. In turn, the shaft 68 is shown with a connection directly to a rotary pulse generator 70. The same type of pulse generator can be installed at the left side of FIG. 4 so that duplicate pulse generators are incorporated. The pulse generator 70 is connected directly to the shaft 68 so that there is a 1:1 ratio between rotation of the shaft 68 and rotation of the pulse generator 70.

Figure 5:
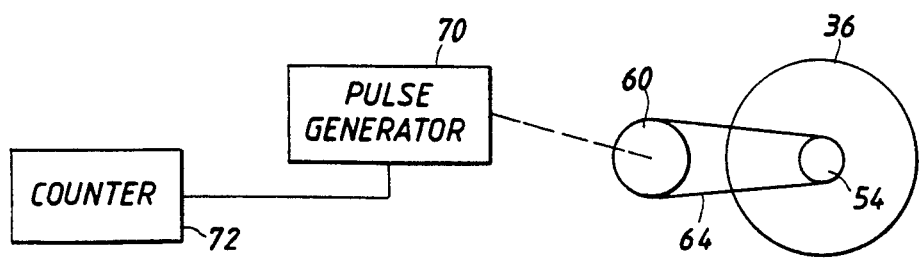
FIG. 5 is a block diagram schematic of the counter mechanism of the present disclosure.

Going now to FIG. 5 of the drawings, the numeral 36 identifies in schematic form the drive sprocket previously discussed. The smaller sprocket 54 rotated with it is also shown. The sprocket 54 drives the chain 64 just defined, and that sprocket chain provides rotation to the driven sprocket 60. As required, the pulse generator 70 is mechanically connected so that it is positively driven to form a procession of pulses. The pulses from the generator 70 are applied to a counter 72, and the output data from the counter 72 is proportionate to the length of tubing which is inserted by the equipment. The basis for this statement is developed below.

Consider as one example the following scale factors which have been applied to this equipment. As mentioned, the drive chain 16 is made of heavy duty chain. The heavy duty chain typically has fairly long links, and one representative length is 1.75 inches for the pitch of the chain. For travel of 2 feet as a representative measure, the number of links required for such motion is 13.7143 assuming a pitch of 1.75. This will rotate a twelve tooth sprocket through 1.1428 turns. Twelve teeth is a typical size for the drive sprocket 36. Thus, linear travel of two feet would result in rotation of 1.1428 turns by the sprocket 36 about its axis.

Since the ratio between the sprockets 54 and 60 is determined by the two sprocket sizes, one suitable combination is to provide a sprocket having 14 teeth which drives a sprocket of 16 teeth. Applying that to the number of turns (1.1428 as determined above), one then obtains 1.0000 revolutions for the sprocket 60. This movement is encoded at the pulse generator by one full revolution. The pulse generator can be provided with scale factors forming an output pulse dependent on incremental rotation, for instance, 100 pulses per revolution, 200 pulses per revolution, 360 pulses per revolution, etc. This is a scale factor that can be readily developed in the pulse generator. Note however that once the ratio is determined, the pulses can be output to the counter 72 and suitable measurements indicative of tubing insertion are then incorporated by the scale factors in the system. Consider the example given above, namely, two feet of linear travel of the chain which results in two feet of linear travel of the tubing. Using the scale factors mentioned above, and forming 200 pulses per revolution at the generator 70, two feet of travel is then represented by 200 pulses, or each foot is then represented by 100 pulses. This enables the counter to read the linear travel of the tubing down to measurements of 0.01 feet, thereby providing the appropriate encoding with a scale factor which enables direct recordation of tubing travel. In the foregoing example, no mention has been made of the pitch of the chain 64. As will be understood, that factor drops out of the example of measurements given.

Returning now to FIG. 4 of the drawings, if desired, the pulse generator 70 can be duplicated at both of the sprockets 60 and 62. The dual pulse generator and the dual chain and sprocket system provides a redundant system. So long as both measurements are identical, this indicates that both sets of equipment are operating correctly. Indeed, the equipment shown in FIG. 2 can also be duplicated by installing a duplicate set on both of the drive chains 16 which are shown in FIG. 1.

While the foregoing is directed to the preferred embodiment, the scope thereof is determined by the claims which follow:

I claim:

1. A method of measuring the tubing inserted into a well which comprises the steps of:
    (a) providing an elongate tubing coiled on a supply reel wherein the tubing is unspooled from the reel and is subject to curvature upon unreeling;
    (b) guiding the tubing through a set of gripping blocks for straightening wherein the tubing is directed for entry axially of the well in which the tubing is inserted;
    (c) moving the tubing into the well by motion applied to the tubing through positive engagement of a drive chain in a tubing injector;
    (d) engaging the drive chain of the tubing injector positively with a sprocket which is rotated in proportion to movement of the drive chain; and
    (e) forming a string of output pulses from a pulse generator which is rotated in a fixed ratio to the sprocket engaging the drive chain so that the pulses occur in proportion to length of tubing traversing with the drive chain.

2. The method of claim 1 wherein the drive chain grips the tubing, and the drive chain forces the tubing downwardly into the well, and wherein the sprocket means engages the drive chain to rotate in proportion thereto.

3. The method of claim 1 wherein said drive sprocket positively engages the drive chain.

4. The method of claim 3 wherein the drive sprocket is meshed with the drive chain.

5. The method of claim 1 wherein the drive chain sprocket is engaged with the drive chain to prevent slippage, and connects with a gear system providing a transfer of chain motion proportionate to motion of the drive chain and including the steps of selecting gears in the drive chain and sprocket so that a particular ratio is achieved to thereby form pulses at a fixed rate from the pulse generator.

6. The method of claim 1 including the step of locating the sprocket at a bracket positioning the sprocket in the drive chain.

7. An apparatus for inserting a tubing into a well borehole in conjunction with a tubing injector, the apparatus comprising:
   (a) a sprocket engaged with a drive chain of the injector to rotate in proportion to movement of the drive chain;
   (b) a pulse generator;
   (c) means connected between said pulse generator and said drive chain sprocket providing a fixed ratio so that chain motion is converted into a pulse train proportionate to chain motion.

8. The apparatus of claim 7 wherein said pulse generator is supported by a mounting bracket attached to said injector.

9. The apparatus of claim 8 wherein said sprocket is connected to rotate a means providing a specified rotational ratio between said pulse generator and said sprocket.

10. The apparatus of claim 8 further wherein:
   (a) a first shaft mounting said sprocket for rotation;
   (b) a second shaft mounting said pulse generator for rotation;
   (c) means connecting between said first and second shafts to rotate said second shaft proportional to said first shaft.

* * * * *